United States Patent

Hokazono

(10) Patent No.: US 10,460,626 B2
(45) Date of Patent: Oct. 29, 2019

(54) AQUEOUS GEL COMPOSITION FOR BODY ORGAN MODEL, AND BODY ORGAN MODEL

(71) Applicant: FUJIFILM Corporation, Tokyo (JP)

(72) Inventor: Hirohisa Hokazono, Ashigara-kami-gun (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 303 days.

(21) Appl. No.: 15/254,145

(22) Filed: Sep. 1, 2016

(65) Prior Publication Data

US 2016/0372010 A1 Dec. 22, 2016

Related U.S. Application Data

(63) Continuation of application No. PCT/JP2015/050630, filed on Jan. 13, 2015.

(30) Foreign Application Priority Data

Mar. 24, 2014 (JP) .................................. 2014-059927

(51) Int. Cl.
*G09B 23/28* (2006.01)
*G09B 23/30* (2006.01)

(52) U.S. Cl.
CPC .................................. *G09B 23/30* (2013.01)

(58) Field of Classification Search
CPC ....... G09B 23/28; G09B 23/286; G09B 23/30
USPC ......................................... 434/262, 267, 272
See application file for complete search history.

(56) References Cited

U.S. PATENT DOCUMENTS

| 8,480,407 | B2 * | 7/2013 | Campbell | G09B 23/28 434/272 |
| 8,801,438 | B2 * | 8/2014 | Sakezles | G09B 23/34 434/274 |
| 2005/0186361 | A1 * | 8/2005 | Fukuda | G09B 23/30 428/15 |
| 2007/0148626 | A1 * | 6/2007 | Ikeda | G09B 23/30 434/272 |

(Continued)

FOREIGN PATENT DOCUMENTS

| JP | 2007316434 A | 12/2007 |
| JP | 2010-277003 A | 12/2010 |
| JP | 2013-200368 A | 10/2013 |
| JP | 2014-044260 A | 3/2014 |
| WO | 2013124725 A1 | 8/2013 |

OTHER PUBLICATIONS

International Preliminary Report on Patentability and Written Opinion, dated Oct. 6, 2016, in International Application No. PCT/JP2015/050630, 10 pages in English.

(Continued)

*Primary Examiner* — Kurt Fernstrom
(74) *Attorney, Agent, or Firm* — Sughrue Mion, PLLC

(57) ABSTRACT

Provided is an aqueous gel composition for a body organ model and the body organ model from which it is possible to obtain an incision touch feeling similar to that of an actual body organ when the body organ model is used. In the above-described aqueous gel composition for a body organ model, brittleness and tenderness measured through a multiple integration bite method are respectively within ranges of 1.10 to 1.70 and 2.94 MPa to 4.90 MPa (30,000 gw/cm$^2$ to 50,000 gw/cm$^2$).

7 Claims, 3 Drawing Sheets

(56) References Cited

U.S. PATENT DOCUMENTS

| | | | | |
|---|---|---|---|---|
| 2010/0047752 A1* | 2/2010 | Chan | ................... | B29C 33/3857 |
| | | | | 434/272 |
| 2012/0045743 A1* | 2/2012 | Okano | ................... | G09B 23/30 |
| | | | | 434/272 |
| 2012/0288839 A1* | 11/2012 | Crabtree | .............. | B65D 75/008 |
| | | | | 434/267 |
| 2013/0177890 A1 | 7/2013 | Sakezles | | |
| 2015/0037776 A1* | 2/2015 | Redaelli | ................. | G09B 23/28 |
| | | | | 434/272 |
| 2016/0027341 A1* | 1/2016 | Kerins | ................... | G09B 23/34 |
| | | | | 434/270 |
| 2016/0155364 A1* | 6/2016 | Piron | ..................... | G01R 33/58 |
| | | | | 434/270 |

OTHER PUBLICATIONS

International Search Report of PCT/JP2015/050630 dated Mar. 31, 2015 [PCT/ISA/210].
Communication dated Feb. 14, 2017, from the Japanese Patent Office in counterpart application No. 2015-004095.
Communication dated Jun. 13, 2017 issued from the Japan Patent Office in the corresponding Japanese Patent Application No. 2015-004095.
Communication dated Mar. 10, 2017 from the European Patent Office in counterpart European application No. 15768133.9.
Office Action dated Aug. 26, 2019 in European Application No. 15768133.9.

* cited by examiner

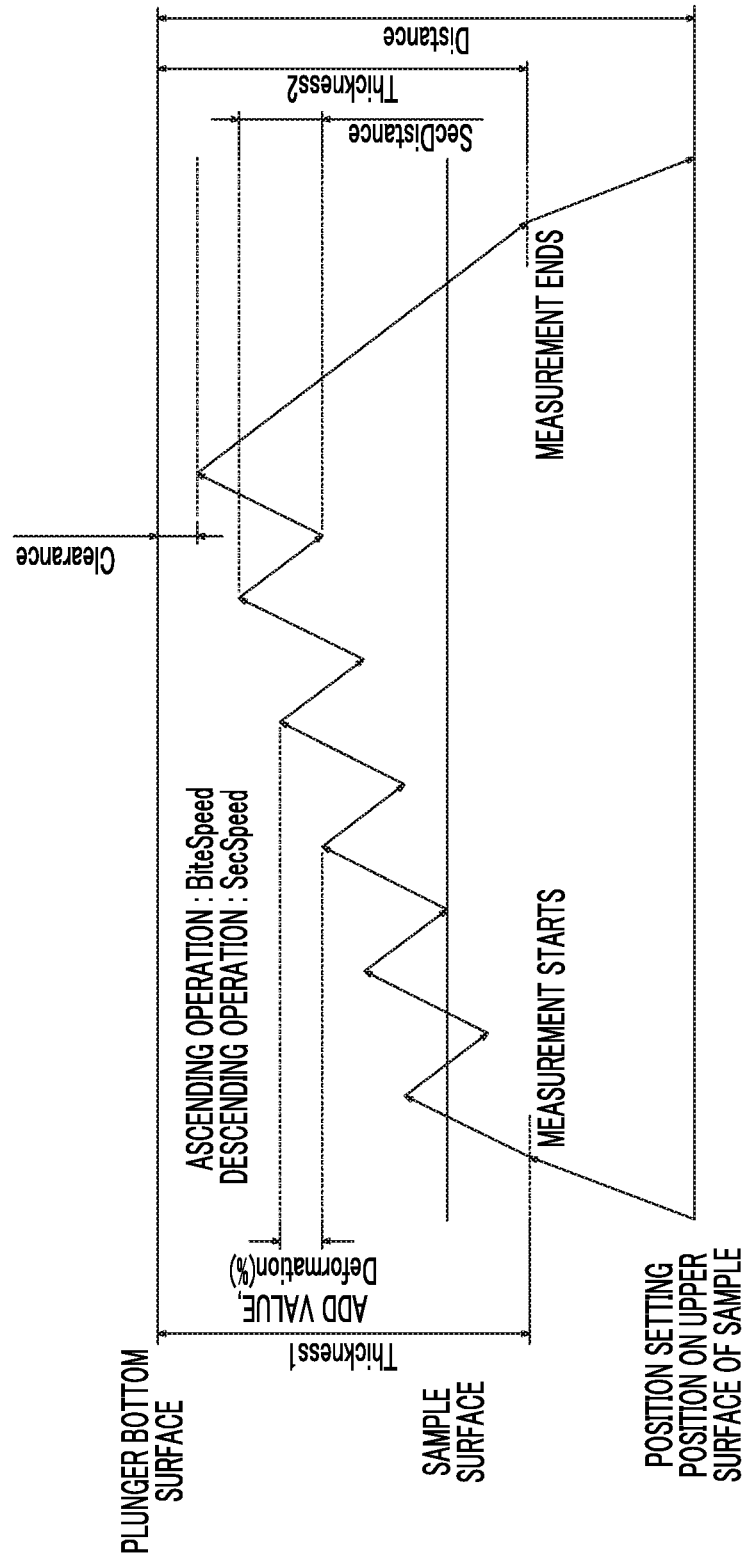

FIG. 2

| CONDITION | ITEM | DATA |
|---|---|---|
| ModeCheck | | 1 |
| Selector | | 3 |
| TimeSample | [sec] | 0 |
| Distance | [mm] | 30 |
| Clearance | [mm] | 0.01 |
| Thickness1 | [mm] | 15 |
| Thickness2 | [mm] | 15 |
| StaticTime | [sec] | 0 |
| BiteSpeed | [mm/sec] | 2 |
| SecondSpeed | [mm/sec] | 2 |
| Multiply | | 2 |
| Magnificant | | 2 |
| BaseLine | | 1 |
| Deformation | [%] | 0 |
| Deformation | [mm] | 0 |
| Deformation | [kg] | 0 |
| IntervalPoint | [%] | 0 |
| IntervalPoint | [mm] | 0 |
| NegaGain | | 1 |
| LoadCell | | 10 |
| PlansureArea | [cm^2] | 0.041 |
| CycleSec | [sec] | 0 |
| Amplitude | [mm] | 0 |
| MonitorSwich | | ON |
| HighSence | | OFF |
| RepeatTime | | 200 |
| MultiRepeat | | 1 |
| Addvalue | [mm] | 0.05 |
| SecondStatic | [sec] | 0 |
| 2ndDistance | [mm] | 0.25 |
| 2ndClearance | [mm] | 0 |
| 2ndDeformation | [%] | 0 |
| 2ndDeformation | [mm] | 0 |
| 2ndDeformation | [kg] | 0 |
| 2ndMultiply | | 1 |
| 2ndMagnificant | | 1 |
| 2ndNegaGain | | 1 |
| FirstStatic | [sec] | 0 |
| RotateSpeed | [° /sec] | 0 |
| RotateMode | | 0 |

AQUEOUS GEL COMPOSITION FOR BODY ORGAN MODEL, AND BODY ORGAN MODEL

CROSS-REFERENCE TO RELATED APPLICATIONS

This application is a Continuation of PCT International Application No. PCT/JP2015/050630 filed on Jan. 13, 2015, which claims priority under 35 U.S.C. § 119(a) to Japanese Patent Application No. 2014-059927 filed on Mar. 24, 2014. The above application is hereby expressly incorporated by reference, in its entirety, into the present application.

BACKGROUND OF THE INVENTION

1. Field of the Invention

The present invention relates to an aqueous gel composition for a body organ model, and the body organ model.

2. Description of the Related Art

In the related art, a body organ model which resembles an actual body organ is used for surgical training of a surgeon. For example, in "Claim 1" of JP2010-277003A, a "molding material for an organ model comprising: aqueous gel and silica particles consisting of polyvinyl alcohol of which an average degree of polymerization is 300 to 3500 and a saponification degree is greater than or equal to 90 mol % is disclosed.

SUMMARY OF THE INVENTION

Pean forceps and a harmonic scalpel are mainly used for incision of the liver. The pean forceps are forceps in which there is no hook at a distal portion, and are surgical instruments for separating tissue by pressing the tissue. The harmonic scalpel is an instrument which simultaneously performs coagulation (hemostasis) and separation of proteins of tissue by transmitting ultrasonic vibration to a blade tip.

The present inventors have conducted studies on the organ model disclosed in JP2010-277003A, and have made it clear that a touch feeling of pressing tissue using pean forceps and a touch feeling of separating tissue while coagulating the tissue using a harmonic scalpel (hereinafter, these kinds of touch feelings will also be collectively called an "incision touch feeling") are different from an incision touch feeling of the liver which is an actual body organ.

The present invention has been made in consideration of the above-described point, and an object of the present invention is to provide an aqueous gel composition for a body organ model and the body organ model from which it is possible to obtain an incision touch feeling similar to that of an actual body organ when the body organ model is used.

The present inventors have conducted extensive studies for achieving the above-described purpose. As a result, they have found that the incision touch feeling is similar to that of an actual body organ by setting specific physical properties in the aqueous gel composition to be within a specific range, and have completed the present invention.

That is, the present invention provides the following (1) to (7).

(1) An aqueous gel composition for a body organ model, in which brittleness and tenderness measured through a multiple integration bite method are respectively within ranges of 1.10 to 1.70 and 2.94 MPa to 4.90 MPa (30,000 gw/cm$^2$ to 50,000 gw/cm$^2$).

(2) The aqueous gel composition for a body organ model according to the above-described (1) which has a phase separation structure in which phases of two or more kinds of gel are separated from each other.

(3) The aqueous gel composition for a body organ model according to the above-described (1) or (2), comprising: polyvinyl alcohol and gelatin, in which the mass ratio of the gelatin to the polyvinyl alcohol is 90/10 to 60/40.

(4) The aqueous gel composition for a body organ model according to any one of the above-described (1) to (3) which is used in a liver model.

(5) The aqueous gel composition for a body organ model according to any one of above-described (1) to (4) which is used in a body organ model for a procedural practice of surgery.

(6) A body organ model in which the aqueous gel composition for a body organ model according to any one of the above-described (1) to (5) is used.

(7) The body organ model according to the above-described (6) which is used for a procedural practice of surgery.

According to the present invention, it is possible to provide an aqueous gel composition for a body organ model and the body organ model from which it is possible to obtain an incision touch feeling similar to an actual body organ when the body organ model is used.

BRIEF DESCRIPTION OF THE DRAWINGS

FIG. 1 is an explanatory view of an operation of TENSIPRESSER.

FIG. 2 is a list showing a parameter used for measurement through a multiple integration bite method.

DESCRIPTION OF THE PREFERRED EMBODIMENTS

Figure 3:
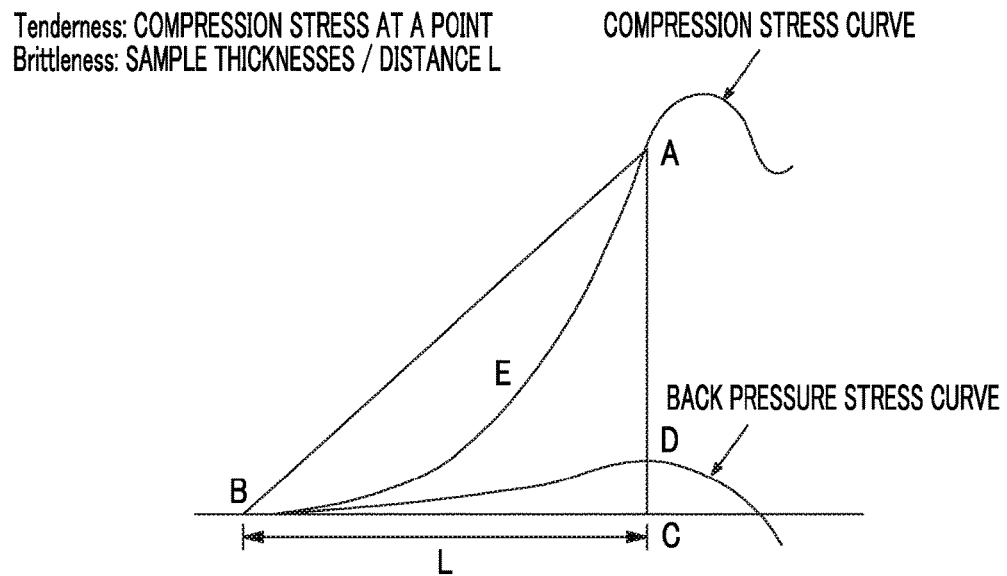
FIG. 3 is a graph showing an example of compression stress measured using TENSIPRESSER.

Aqueous Gel Composition for Body Organ Model

An aqueous gel composition for a body organ model of the present invention (hereinafter, also simply referred to an "aqueous gel composition of the present invention") is an aqueous gel composition for a body organ model in which brittleness and tenderness measured through a multiple integration bite method are respectively within ranges of 1.10 to 1.70 and 2.94 MPa to 4.90 MPa (30,000 gw/cm$^2$ to 50,000 gw/cm$^2$).

In the aqueous gel composition of the present invention, it is possible to obtain an incision touch feeling similar to that of an actual body organ (in particular, human liver) when a body organ model (in particular, human liver model) is used, by satisfying the above-described physical properties (brittleness and tenderness).

Hereinafter, the above-described physical properties which are unique for the present invention will be first described.

[Physical Properties Measured Through Multiple Integration Bite Method]

In the present invention, the physical properties of the aqueous gel composition used in the body organ model is measured through a multiple integration bite method in which TENSIPRESSER (trade name: MY BOY 2 SYSTEM) manufactured by Taketomo Electric Inc. The multiple integration bite method is generally a method for measuring compression stress of a sample when a regular plunger is gradually pushed while being subjected to slight vertical amplitude.

FIG. 1 is an explanatory view of an operation of TEN-SIPRESSER and FIG. 2 is a list showing a parameter used for measurement through a multiple integration bite method.

The TENSIPRESSER (trade name: MY BOY 2 SYSTEM) includes a sample stand which can be moved in a vertical direction; and a plunger which is disposed so as to be fixed at a position facing the upper surface of the sample stand.

After making a sample stand, on which a sample (length of 3 cm×width of 3 cm×thickness of 7 mm) is placed on the upper surface, approach a cylindrical plunger (outer diameter: 5.5 mm, inner diameter: 5.0 mm) by 0.30 mm at a speed (bite speed) of 2 mm/sec, the sample stand is kept away from the cylindrical plunger by 0.25 mm at a speed (second speed) of 2 mm/sec, and these actions are repeated. Accordingly, the plunger is pushed into the sample by 0.05 mm (add value). Compression stress at this time is measured.

FIG. 3 is a graph showing an example of compression stress measured using TENSIPRESSER. A lateral axis represents the pushing distance of the plunger and a longitudinal axis represents compression stress.

As shown in FIG. 3, the measured compression stress increases according to the pushing distance (represented by "L" in FIG. 3) of the plunger. However, in a case where a sample is a material having brittleness, the sample is destroyed in the middle of the operation, and the compression stress suddenly decreases at this destruction point in time. That is, a point, at which the inclination of a tangent of the graph is changed, appears. The value of the compression stress at this point (represented by "A" in FIG. 3) is set as tenderness.

The thickness of the sample with respect to the pushing distance L of the plunger (sample thickness/distance L) at the above-described point A is set as brittleness.

For example, in a case where the sample is an elastic material such as rubber having no brittleness, the sample is not destroyed in the middle of the operation. Therefore, the point A at which the compression stress rapidly decreases does not appear and the plunger is pushed by the portion equivalent to the thickness of the sample. That is, the distance L becomes the same as the thickness of the sample, and therefore, the brittleness becomes 1/1=1.

In contrast, in a case where, for example, the sample has brittleness and is destroyed at a point in time of the half of the distance L, the brittleness at the point A becomes 1/0.5=2.

The tissue of the liver is formed of constitutional units, such as prismatic or columnar hepatic lobules with a diameter of about 1 mm and a height of about 1 mm, being assembled. For this reason, there is unique brittleness in the liver and there is a unique incision touch feeling based on this brittleness.

On the basis of such an actual circumstance, the present inventors have found that an incision touch feeling of the body organ model similar to an actual incision touch feeling can be obtained by realizing unique brittleness in an actual body organ (in particular, the liver), in a case where brittleness measured through the above-described method is within a range of 1.10 to 1.70 and tenderness measured through the above-described method is within a range of 2.94 MPa to 4.90 MPa (30,000 gw/cm$^2$ to 50,000 gw/cm$^2$).

Particularly, from the reason that the similarity of a touch feeling of pressing tissue becomes high using pean forceps with that of an actual object, it is preferable that brittleness is 1.12 to 1.55 and tenderness is 3.73 MPa to 4.81 MPa (38,000 gw/cm$^2$ to 49,000 gw/cm$^2$) and it is more preferable that brittleness is 1.17 to 1.40 and tenderness is 4.12 MPa to 4.61 MPa (42,000 gw/cm$^2$ to 47,000 gw/cm$^2$).

The unit of tenderness measured using the above-described TENSIPRESSER (trade name: MY BOY 2 SYSTEM) and MULTIPLE INTEGRATION BITE MEASUREMENT ANALYSIS 2 (Ver. 2.02) which is a Windows (registered trademark) program to be described below is "gw/cm$^2$". In the present invention, the unit "gw/cm$^2$" is converted into the unit "MPa" after the measurement, and the third decimal point of the numerical value after the conversion is rounded off.

Specifically, in a case where, for example, a numerical value of "49,000 (gw/cm$^2$)" is measured as tenderness, the numerical value is converted into "4.8052585 (MPa)" using a calculation formula of "(49000/1000)×0.0980665", and the third decimal point is rounded off to obtain "4.81 (MPa)".

[Phase Separation Structure]

As described above, tissue of an actual body organ, in particular, the liver is an aggregate of constitutional units such as hepatic lobules with a diameter of about 1 mm.

For this reason, from the viewpoint of imitating a touch feeling similar to an actual object, it is preferable that the aqueous gel composition of the present invention has a structure in which phases of two or more kinds of gel are separated from each other (phase separation structure), and it is more preferable that the gel forms an island structure to separate phases thereof from each other, and it is still more preferable that gel (island) with a diameter of 0.1 mm to 10 mm is dispersed the other gel (sea) to separate phases thereof from each other.

The checking of the phase separation structure is performed through visual observation or optical microscope observation.

[Preferred Aspect of Aqueous Gel Composition]

The aqueous gel composition of the present invention is not particularly limited as long as the aqueous gel composition satisfies the above-described physical properties (brittleness and tenderness), but examples thereof include an aqueous gel composition containing polyvinyl alcohol and gelatin.

Hereinafter, an example of this preferred aspect will be described. However, needless to say, the aqueous gel composition of the present invention is not limited thereto.

<Polyvinyl Alcohol>

Polyvinyl alcohol (hereinafter, conveniently denoted as "PVA") is generally obtained by saponifying polyvinyl acetate obtained by polymerizing vinyl acetate monomers.

The polyvinyl alcohol used in the present invention is not particularly limited, and well-known polyvinyl alcohol in the related art can be appropriately used.

For example, the average polymerization degree (viscosity average degree of polymerization) obtained through a viscosity method of polyvinyl alcohol is not particularly limited, but is preferably 300 to 3500, more preferably 500 to 3000, still more preferably 1000 to 2500, and particularly preferably 1200 to 2000 from the viewpoint of the obtained mechanical strength in the body organ model or appropriate elasticity similar to a human organ.

In addition, saponification degree of polyvinyl alcohol is not particularly limited, but is preferably greater than or equal to 90 mol %, more preferably greater than or equal to 95 mol %, and still more preferably greater than or equal to 98 mol %, from the viewpoint of mechanical strength and modulus of elasticity of the obtained body organ model.

There is no limitation in an upper limit value of the saponification degree of polyvinyl alcohol. However, the higher saponification degree is preferable, and fully saponified polyvinyl alcohol is particularly preferable.

The polyvinyl alcohol may be used singly or two or more kinds thereof may be used in combination.

Examples of the concentration of polyvinyl alcohol with respect to the total mass of the aqueous gel composition of the present invention include 4 mass % to 20 mass %. 5 mass % to 20 mass % is preferable and 5 mass % to 15 mass % is more preferable.

<Gelatin>

In general, gelatin can be obtained through extraction by adding heat to collagen. The origin of collagen is not particularly limited, and collagen may be derived from any of fish, cattle, swine, and goat, or through genetic modification or the like.

Gelatin used in the present invention is not particularly limited, and well-known gelatin can be appropriately used. Specific examples thereof include alkali-treated gelatin involving treatment using calcium or the like in an inducing process from collagen; acid-treated gelatin involving treatment using hydrochloric acid or the like; enzyme-treated gelatin involving treatment using a hydrolase; and modified gelatin (for example, phthalated gelatin, succinated gelatin, or trimellitic gelatin) which is treated with a reagent having a group that can react with a functional group (for example, an amino group, an imino group, a hydroxy group, or a carboxy group) contained in a gelatin molecule. These may be used singly or two or more kinds thereof may be used in combination.

The concentration of gelatin with respect to the total mass of aqueous gel composition of the present invention is preferably 0.1 mass % to 8.0 mass % and more preferably 0.3 mass % to 5.0 mass %.

<Mass Ratio of Gelatin to Polyvinyl Alcohol>

In a case where the aqueous gel composition of the present invention contains polyvinyl alcohol and gelatin, examples of the mass ratio thereof (polyvinyl alcohol/gelatin) include 95/5 to 60/40. 90/10 to 60/40 is preferable, 85/15 to 65/35 is more preferable, and 80/20 to 70/30 is still more preferable.

If the above-described mass ratio is within this range, the amount of gelatin having protein as a main component becomes appropriate, and therefore, the similarity of a touch feeling of separating proteins of tissue while coagulating the proteins of the tissue using a harmonic scalpel, with that of an actual object is more improved.

<Method for Preparing Aqueous Gel Composition or the Like>

The aqueous gel composition of the present invention can be prepared by cooling an aqueous solution (hereinafter, also referred to as a "PVA/gelatin aqueous solution) containing the above-described polyvinyl alcohol and gelatin to a temperature less than or equal to −10° C., and then, defrosting the cooled aqueous solution. The PVA/gelatin aqueous solution is frozen through the above-described cooling, and at this time, the PVA/gelatin aqueous solution is gelled.

The cooling temperature is preferably −15° C. to −35° C. and more preferably −20° C. to −30° C. The cooling time is preferably 1 hour to 10 hours and more preferably 3 hours to 8 hours.

The defrosting may be naturally performed by allowing the solution to stand at room temperature, or may be performed through heating. The defrosting temperature is not particularly limited, and is generally about room temperature to 40° C.

The defrosted aqueous gel composition may be heated in, for example, a drying chamber as necessary from the viewpoint of uniformizing tissue. The heating temperature is, for example, less than or equal to 80° C. 35° C. to 75° C. is preferable and 40° C. to 70° C. is more preferable. After the heating, the aqueous gel composition may be cooled to room temperature.

It is possible to add polysaccharides to the PVA/gelatin aqueous solution which becomes the aqueous gel composition of the present invention from the viewpoint of preventing drying of a surface layer. Suitable examples of the polysaccharides include chitosan and a derivative thereof.

Furthermore, for example, coloring agents such as pigments or dyes; additives such as perfume, antioxidants, antifungal agents, and antibacterial agents may be added in an appropriate amount within a target range of the present invention.

The moisture contents in the aqueous gel composition and the PVA/gelatin aqueous solution of the present invention are not particularly limited, and preferred examples thereof include 70 mass % to 95 mass %, and 75 mass % to 93 mass % is more preferable.

[Body Organ Model]

The body organ model of the present invention can be obtained using the above-described aqueous gel composition of the present invention, and, for example, a part or the entirety of the body organ model consists of the aqueous gel composition of the present invention.

For example, it is possible to produce the body organ model of the present invention simultaneously with the preparation of the aqueous gel composition of the present invention. In this case, the body organ model of the present invention can be produced by injecting the above-described PVA/gelatin aqueous solution into a forming mold having an inner shape corresponding to a form of an organ and cooling and defrosting the PVA/gelatin aqueous solution in this forming mold. Regarding the conditions of the cooling, the defrosting, and the like, it is possible to employ conditions denoted as the conditions in the method for preparing the aqueous gel composition.

In addition, as the body organ model of the present invention, an aspect of having a surface layer consisting of the aqueous gel composition of the present invention can also be suitably exemplified. From the viewpoint of realizing light weight and making the body organ model approximate to an actual organ, the inside of the body organ model is preferably hollow.

In this case, examples of the method for producing the body organ model of the present invention include a production method by forming a surface layer consisting of the aqueous gel composition of the present invention on the surface of a balloon of which the inside is hollow; and a production method by curving the sheet-like aqueous gel composition of the present invention to make a cylindrical shape, and bonding end portions of this sheet to each other.

In a case where the inside of the balloon is made to hollow, the balloon may be filled with a liquid or gel as necessary.

Furthermore, in the body organ model of the present invention, a surface layer consisting of the aqueous gel composition of the present invention may be formed on a substrate having an inner shape corresponding to an organ from the viewpoint of making the body organ model be more approximate to the actual body organ.

In order to make the body organ model of the present invention be more approximate to an actual body organ, folds, wrinkles, a tube likened to a blood vessel or the like, a surface thin film, or the like may be formed on the surface, the inside, and the inner surface of the body organ model of the present invention using the aqueous gel composition of the present invention as necessary.

In the above-described description, an example of the liver model which resembles the human liver has been mainly described. However, the present invention is not limited thereto, and examples of other body organs include the brain, the heart, the esophagus, the stomach, the bladder, the small intestine, the large intestine, the kidneys, the pancreas, the spleen, and the uterus.

The body organ model of the present invention obtained using the aqueous gel composition of the present invention can be suitably used as a body organ model for a procedural practice of surgery since an incision touch feeling similar to an actual body organ can be obtained.

EXAMPLES

Hereinafter, the present invention will be specifically described using Examples. However, the present invention is not limited thereto.

Example 1

(Production of Liver Model)

First, a PVA/gelatin aqueous solution was prepared by adding polyvinyl alcohol (trade name of KURARAY POVAL PVA-117H manufactured by KURARAY CO., LTD.), of which the viscosity average degree of polymerization was 1700 and the saponification degree was greater than or equal to about 99.3 mol %, to water so as to make the concentration of the polyvinyl alcohol be 7 mass %, and adding gelatin (manufactured by Wako Pure Chemical Industries, Ltd.) to water so as to make the concentration of the gelatin be 3 mass %.

The prepared PVA/gelatin aqueous solution was stirred for 3 hours while heating the solution to 85° C., and was then cooled to about 60° C. Next, 0.15 g of an edible coloring agent of red (manufactured by KYORITSU FOODS CO, INC.) and 0.015 g of an edible coloring agent of green (manufactured by KYORITSU FOODS CO, INC.) were added thereto for the purpose of making the color of the solution close to the human liver, and the mixture was stirred and colored so as to have a uniform composition. 500 mL of the colored PVA/gelatin aqueous solution was placed in a beaker with a 1 L capacity.

Forming molds (forming molds of which the upper portion and the lower portion were divided) which had an inner shape corresponding to a form of the human liver and was made of gypsum was produced, and the inner surfaces of the forming molds were coated with a mold release agent. Then, the forming molds were jointed to each other, the joint surfaces were tightly sealed, the forming molds were cooled in a freezing chamber (room temperature: −20° C.) in advance, and the above-described colored PVA/gelatin aqueous solution (liquid temperature: 60° C.) was injected through injection holes provided on the upper surfaces of the forming molds.

Next, the forming molds into which the PVA/gelatin aqueous solution was injected were placed in the freezing chamber (room temperature: −20° C.), and were cooled for 5 hours. Then, the forming molds were taken out of the freezing chamber and were left to stand at room temperature until the temperature thereof reached room temperature.

Next, the forming molds left to stand at room temperature were placed in a drier, heated until the temperature thereof reached 60° C., and were held at the same temperature for 1 hour. Then, the forming molds were taken out of the drier and were cooled. Thereafter, a liver model was obtained by opening the forming molds and taking out the liver model (body organ model).

(Phase Separation Structure)

Regarding the obtained liver model, a phase separation structure was checked through visual observation or observation using an optical microscope. In a case where it is confirmed that gelatin with a diameter of 0.1 mm to 10 mm is dispersed in PVA, and phases thereof are separated from each other, "A" is denoted in the following first table, in a case where it is confirmed that gelatin with a diameter of larger than 10 mm is dispersed in PVA, and phases thereof are separated from each other, "B" is denoted in the following first table, and in a case where no phase separation structure is confirmed, "C" is denoted in the following first table.

(Measurement of Physical Properties Through Multiple Integration Bite Method)

A sample (length of 3 cm×width of 3 cm×thickness of 7 mm) was cut out from the obtained liver model, and brittleness and tenderness were measured through the above-described multiple integration bite method using TENSIPRESSER (trade name: MY BOY 2 SYSTEM) manufactured by Taketomo Electric Inc. and MULTIPLE INTEGRATION BITE MEASUREMENT ANALYSIS 2 (Ver. 2.02) which was a Windows (registered trademark) program. The results are shown in the following first table.

(Evaluation of Incision Touch Feeling)

An incision touch feeling of the obtained liver model was evaluated by a surgeon. Specifically, a touch feeling of pressing tissue using pean forceps (14.5 cm hemostatic pean forceps manufactured by FRIGZ) and a touch feeling of separating tissue while coagulating the tissue using a harmonic scalpel (HARMONIC SCALPEL II manufactured by Johnson & Johnson K.K.) were evaluated in four stages of the following A to D, from the viewpoint of similarity of the touch feelings with those of an actual body organ (human liver). If the result shows A or B, it can be evaluated that the model is suitable for procedural practice in surgery since the incision touch feeling is similar to that of an actual body organ (liver).

A: Model extremely resembles actual body organ
B: Model resembles actual body organ
C: Model is slightly different from actual body organ
D: Model is different from actual body organ Example 2

The production and the evaluation of a liver model were performed in the same manner as in Example 1 except that the concentration of polyvinyl alcohol was set to 9.5 mass % and the concentration of gelatin was set to 0.5 mass %. The results are shown in the following first table.

Example 3

The production and the evaluation of a liver model were performed in the same manner as in Example 1 except that polyvinyl alcohol (trade name of KURARAY POVAL PVA-110 manufactured by KURARAY CO., LTD.), of which the viscosity average degree of polymerization was 1000 and the saponification degree was about 98 mol % to 99 mol %, was used as polyvinyl alcohol. The results are shown in the following first table.

Example 4

The production and the evaluation of a liver model were performed in the same manner as in Example 1 except that the concentration of polyvinyl alcohol was set to 8.0 mass % and the concentration of gelatin was set to 2.0 mass %. The results are shown in the following first table.

Example 5

The production and the evaluation of a liver model were performed in the same manner as in Example 1 except that the concentration of polyvinyl alcohol was set to 9.0 mass % and the concentration of gelatin was set to 1.0 mass %. The results are shown in the following first table.

Example 6

The production and the evaluation of a liver model were performed in the same manner as in Example 1 except that the concentration of polyvinyl alcohol was set to 6.0 mass % and the concentration of gelatin was set to 4.0 mass %. The results are shown in the following first table.

Example 7

The production and the evaluation of a liver model were performed in the same manner as in Example 1 except that the concentration of polyvinyl alcohol was set to 5.5 mass % and the concentration of gelatin was set to 4.5 mass %. The results are shown in the following first table.

Comparative Example 1

The production and the evaluation of a liver model were performed in the same manner as in Example 1 except that gelatin was not added. The results are shown in the following first table.

Comparative Example 2

First, a PVA aqueous solution was prepared by adding polyvinyl alcohol (trade name of KURARAY POVAL PVA-117 manufactured by KURARAY CO., LTD.), of which the viscosity average degree of polymerization was 1700 and the saponification degree was about 98 mol % to 99 mol %, to water so as to make the concentration of the polyvinyl alcohol be 10 mass %. The prepared PVA aqueous solution was stirred for 3 hours while heating the solution to 85° C., and was then cooled to normal temperature. 500 mL of the cooled PVA aqueous solution was placed in a beaker with a 1 L capacity.

Next, 15 mL of colloidal silica (manufactured by NISSAN CHEMICAL INDUSTRIES, LTD., trade name: SNOWTEX XP, particle diameter of silica: about 5 nm, content of silica: 5 mass %) was added to the above-described beaker, and the contents in the beaker were stirred so as to have a uniform composition. Thereafter, 0.5 mL of semitransparent acrylic poster color (trade name of DELTA SERUM COAT manufactured by Delta Electronics, Inc.) which was reddish brown color close to the color of the human liver was added thereto, and the mixture was stirred and colored so as to have a uniform composition.

Forming molds (forming molds of which the upper portion and the lower portion were divided) which had an inner shape corresponding to a form of the human liver and was made of gypsum was produced, and the inner surfaces of the forming molds were coated with a mold release agent. Then, the forming molds were jointed to each other, the joint surfaces were tightly sealed, and the above-described colored PVA aqueous solution (liquid temperature: 20° C.) was injected through injection holes provided on the upper surfaces of the forming molds.

Next, the forming molds into which the PVA aqueous solution was injected were placed in a freezing chamber (room temperature: −20° C.), and were cooled for 5 hours. Then, the forming molds were taken out of the freezing chamber and were left to stand at room temperature until the temperature thereof reached room temperature.

Next, the forming molds left to stand at room temperature were placed in a drier, heated until the temperature thereof reached 60° C., and were held at the same temperature for 10 minutes. Then, the forming molds were taken out of the drier and were cooled. Thereafter, a liver model was obtained by opening the forming molds and taking out the liver model (body organ model).

The evaluation of the obtained liver model was performed in the same manner as in Example 1. The results are shown in the following first table. The aspect of the liver model in Comparative Example 2 corresponds to the aspect disclosed in JP2010-277003A.

Comparative Example 3

The production and the evaluation of a liver model were performed in the same manner as in Example 1 except that the concentration of polyvinyl alcohol was set to 9.7 mass % and the concentration of gelatin was set to 0.3 mass %. The results are shown in the following first table.

Comparative Example 4

The production and the evaluation of a liver model were performed in the same manner as in Example 1 except that the concentration of polyvinyl alcohol was set to 5 mass % and the concentration of gelatin was set to 5 mass %. The results are shown in the following first table.

Comparative Example 5

The production and the evaluation of a liver model were performed in the same manner as in Example 1 except that gelatin was not added, polyvinyl alcohol (trade name of KURARAY POVAL PVA-205 manufactured by KURARAY CO., LTD.), of which the viscosity average degree of polymerization was 500 and the saponification degree was about 87 mol % to 89 mol %, was used as polyvinyl alcohol, and the concentration of polyvinyl alcohol was set to 10 mass %. The results are shown in the following first table.

TABLE 1

First Table

|  | Brittleness | Tenderness [MPa] | Tenderness [gw/cm$^2$] | Mass ratio (PVA/Gelatin) | Phase separation structure | Incision touch feeling | |
|---|---|---|---|---|---|---|---|
|  |  |  |  |  |  | Pean forceps | Harmonic scalpel |
| Example 1 | 1.20 | 4.41 | 45,000 | 70/30 | A | A | A |
| Example 2 | 1.14 | 4.81 | 49,000 | 95/5 | A | B | B |
| Example 3 | 1.30 | 3.92 | 40,000 | 70/30 | A | B | A |
| Example 4 | 1.25 | 4.51 | 46,000 | 80/20 | A | A | A |
| Example 5 | 1.20 | 4.61 | 47,000 | 90/10 | A | A | A |
| Example 6 | 1.40 | 4.12 | 42,000 | 60/40 | A | A | A |
| Example 7 | 1.69 | 3.82 | 39,000 | 55/45 | A | B | B |
| Comparative Example 1 | 1.04 | 5.20 | 53,000 | 100/0 | C | D | D |
| Comparative Example 2 | 1.05 | 5.30 | 54,000 | 100/0 | C | D | D |
| Comparative Example 3 | 1.06 | 5.59 | 57,000 | 97/3 | A | D | C |
| Comparative Example 4 | 1.80 | 1.96 | 20,000 | 50/50 | B | D | D |
| Comparative Example 5 | 1.05 | 5.10 | 52,000 | 100/0 | C | D | D |

As is clear from the results shown in the above-described first table, it was found that the liver models of Examples 1 to 7, in which the brittleness was within a range of 1.10 to 1.70 and the tenderness was within a range of 2.94 MPa to 4.90 MPa (30,000 gw/cm$^2$ to 50,000 gw/cm$^2$), were suitable for procedural practice in surgery since the incision touch feeling was similar to the actual liver.

Particularly, it was found that touch feeling of pressing tissue using pean forceps in Examples 1, 4, 5, and 6, in which the brittleness was within a range of 1.17 to 1.40 and the tenderness was within a range of 4.12 MPa to 4.61 MPa (42,000 gw/cm$^2$ to 47,000 gw/cm$^2$), was more similar to that of an actual object than that in Examples 2, 3, and 7, in which at least any one thereof was out of this range.

In addition, it was found that a touch feeling of separating proteins of tissue while coagulating the proteins of the tissue using a harmonic scalpel in Examples 1 and 3 to 6, in which the mass ratio (PVA/gelatin) was within a range of 90/10 to 60/40 was more similar to that of an actual object than that in Examples 2 and 7, in which the above-described mass ratio was out of this range.

The liver models of Examples 1 to 7 were checked by a surgeon, and as a result, an evaluation of the "forms of these liver models resembled a form of the human liver" was obtained.

In addition, regarding the liver models of Examples 1 to 7, it is also possible to perform handling using general surgical instruments, other than the pean forceps and the harmonic scalpel, in particular, Kocher's forceps, a scalpel, and a laser scalpel.

In contrast, the similarity of the incision touch feeling in Comparative Examples 1 to 5, in which the brittleness and the tenderness were out of respective ranges of 1.10 to 1.70 and 2.94 MPa to 4.90 MPa (30,000 gw/cm$^2$ to 50,000 gw/cm$^2$), with that of an actual object was deteriorated.

What is claimed is:

1. An aqueous gel composition for a body organ model, wherein brittleness and tenderness measured through a multiple integration bite method are respectively within ranges of 1.10 to 1.70 and 2.94 MPa to 4.90 MPa, wherein the aqueous gel composition for a body organ model comprises polyvinyl alcohol and gelatin, and wherein the mass ratio (polyvinyl alcohol/gelatin) is 90/10 to 60/40.

2. The aqueous gel composition for a body organ model according to claim 1 which has a phase separation structure in which phases of two or more kinds of gel are separated from each other.

3. The aqueous gel composition for a body organ model according to claim 1, of which a liver model is formed.

4. A body organ model made of the aqueous gel composition for a body organ model according to claim 1.

5. A body organ model for a procedural practice of surgery made of the aqueous gel composition for a body organ model according to claim 1.

6. The aqueous gel composition for a body organ model according to claim 2, of which a liver model is formed.

7. The aqueous gel composition for a body organ model according to claim 1, wherein brittleness and tenderness measured through a multiple integration bite method are respectively within ranges of 1.17 to 1.40 and 4.12 MPa to 4.61 MPa.

* * * * *